US011707969B2

(12) United States Patent
Rollinson et al.

(10) Patent No.: US 11,707,969 B2
(45) Date of Patent: Jul. 25, 2023

(54) METHODS AND SYSTEMS FOR A VEHICLE AIR CONDITIONING SYSTEM

(71) Applicant: Ford Global Technologies, LLC, Dearborn, MI (US)

(72) Inventors: Jim Rollinson, Superior Township, MI (US); Mike Rowland, Wickham Bishops (GB); John Rollinger, Troy, MI (US); Hugh Hamilton, Troy, MI (US); Stephen White, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 16/929,307

(22) Filed: Jul. 15, 2020

(65) Prior Publication Data

US 2021/0016631 A1    Jan. 21, 2021

(30) Foreign Application Priority Data

Jul. 17, 2019    (GB) ..................................... 1910215

(51) Int. Cl.
*B60H 1/32*    (2006.01)
*F25B 13/00*    (2006.01)
*F25D 17/06*    (2006.01)

(52) U.S. Cl.
CPC ........... *B60H 1/3227* (2013.01); *F25B 13/00* (2013.01); *F25D 17/067* (2013.01)

(58) Field of Classification Search
CPC ............ B60H 1/00878; B60H 1/00735; B60H 2001/3275; B60H 2001/3261; B60H 2001/3241; B60H 1/3205; B60H 1/3227; F25B 2700/173; F25B 49/005; F25B 2700/21171; F25B 2700/2106; F25B 2500/19; F25B 13/00; F25D 17/067
See application file for complete search history.

(56) References Cited

U.S. PATENT DOCUMENTS 5,873,257 A    2/1999  Peterson
6,233,957 B1   5/2001  Hirao et al.

FOREIGN PATENT DOCUMENTS

WO    WO-2008153518 A1 * 12/2008 ........... B60H 1/3226

OTHER PUBLICATIONS

Great Britain Intellectual Property Administration, Combined Search and Examination Report under Sections 17 and 18 (3) Issued in Application No. GB1910215.1, dated Dec. 18, 2019, 5 pages.

* cited by examiner

*Primary Examiner* — Ana M Vazquez
(74) *Attorney, Agent, or Firm* — Vincent Mastrogiacomo; McCoy Russell LLP

(57) ABSTRACT

Methods and systems are provided for an air conditioning system. An example method of determining current through a compressor suction valve in a vehicle air conditioning (AC) system is provided, the AC system comprises an evaporator fan and the method includes determining the speed of the evaporator fan and determining the current through the suction valve based on the speed of the evaporator fan.

20 Claims, 2 Drawing Sheets

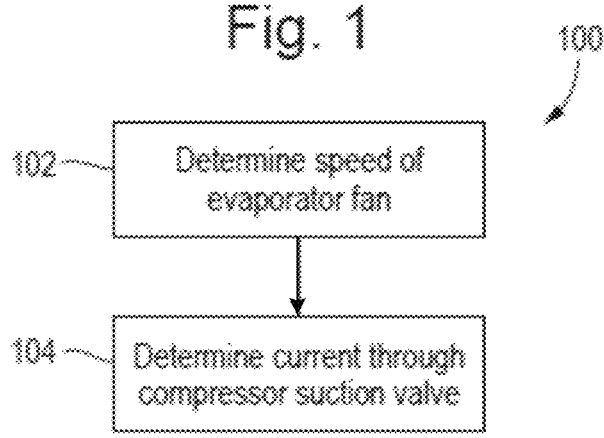
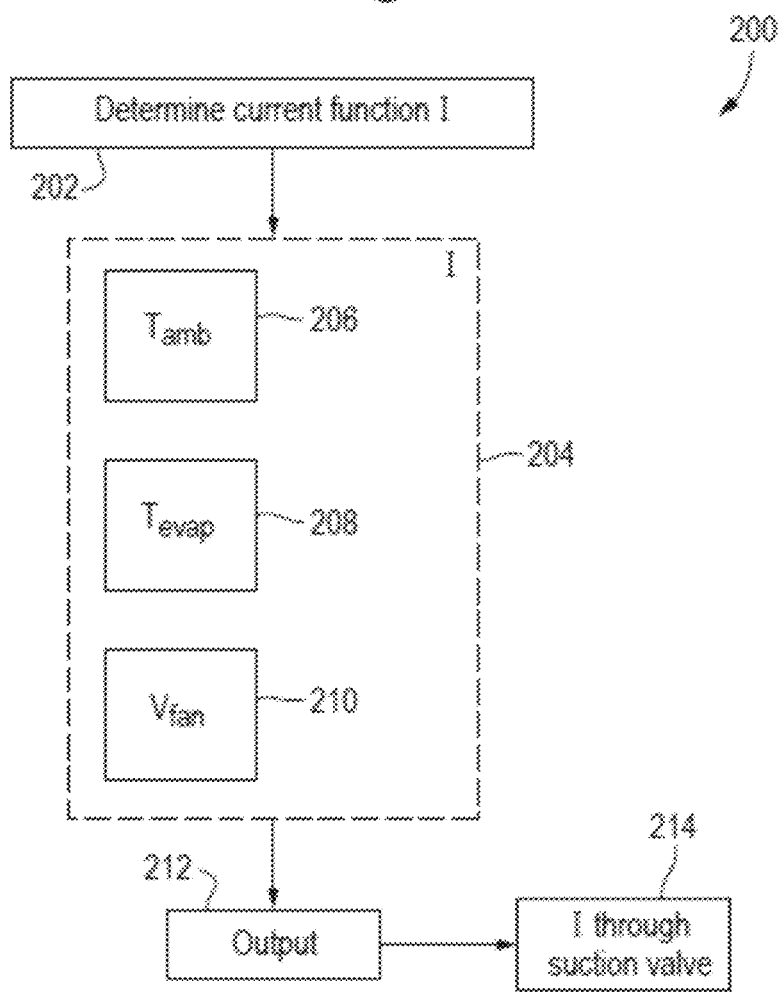

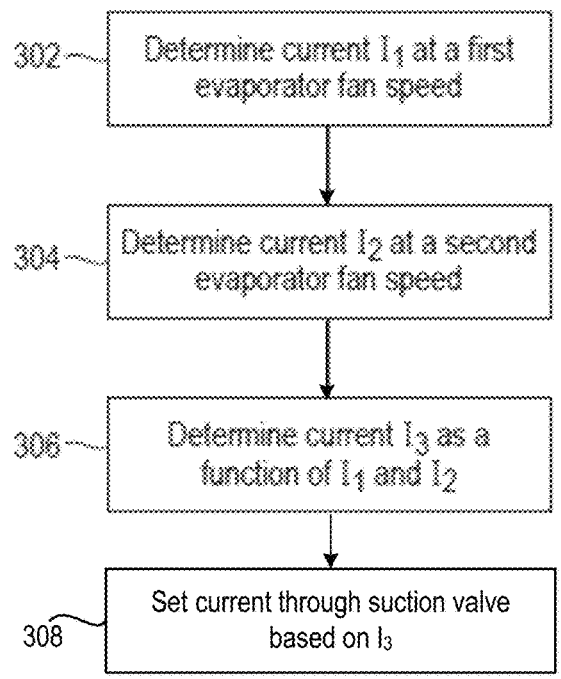
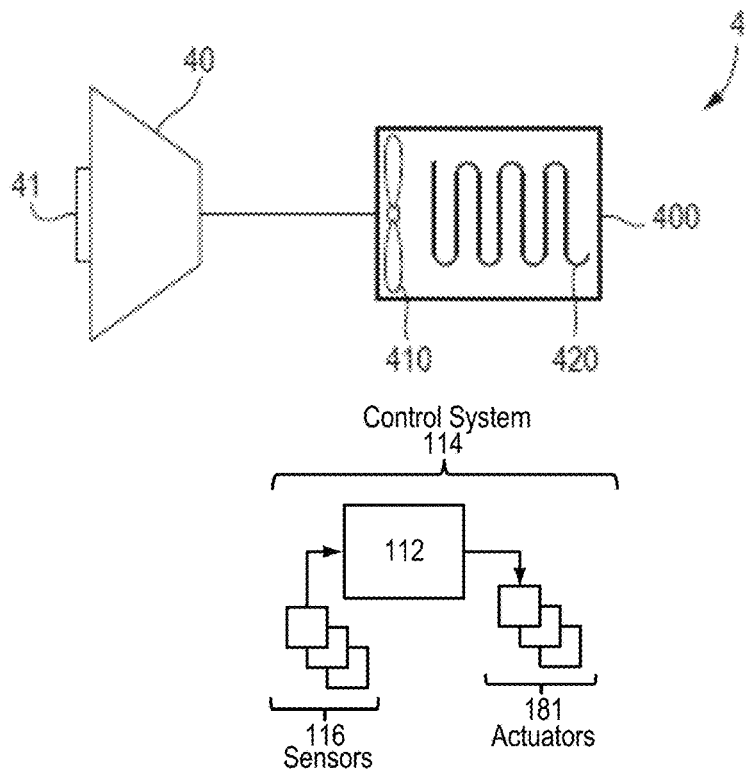

METHODS AND SYSTEMS FOR A VEHICLE AIR CONDITIONING SYSTEM

CROSS REFERENCE TO RELATED APPLICATIONS

The present application claims priority to United Kingdom Patent Application No. 1910215.1 filed on Jul. 17, 2019. The entire contents of the above-listed application is hereby incorporated by reference for all purposes.

FIELD

The present description relates generally to determining current through a compressor suction valve in a vehicle air conditioning system

BACKGROUND/SUMMARY

Some example AC systems may use an externally variable displacement compressor to compress refrigerant vapor into a high temperature, high pressure, refrigerant vapor. A compressor suction valve may be used to draw the refrigerant vapor into the compressor. At higher temperatures and pressures, the refrigerant vapor may be at an appropriate temperature and pressure to be condensed and as a result, in these example AC systems, the refrigerant vapor then flows into a condenser. In the condenser, the refrigerant vapor may be condensed to remove some of the heat from the hot gas via ambient air passing across at least one fin, or coil of the condenser. At the condenser, some of the heat is removed (by the ambient air) from the refrigerant vapor which is condensed into a liquid. The liquid refrigerant may still be pressurized and hot despite some of its heat being removed at the condenser, and flows into an expander, such as an expansion valve or orifice tube. At the expander, the warm liquid refrigerant may undergo expansion causing a pressure drop. The pressure drop causes a temperature drop and hence the refrigerant exiting the expander is a cold refrigerant liquid. The cold liquid refrigerant then flows into an evaporator. The evaporator comprises at least one coil through which the cold liquid refrigerant flows. An evaporator fan blows air to be cooled over the evaporator coil. As the air to be cooled flows over the evaporator coil(s) the cold liquid refrigerant flowing through the coil(s) removes heat from the air to cool the air. Hence, the air exits the evaporator at a cooled, lower temperature, air and is thereafter routed to an area to be cooled (e.g. an interior of a vehicle if the AC system is a vehicle AC system). During the evaporation cycle, the cold liquid refrigerant is heated by the air to be cooled (as the heat is removed from the air by the refrigerant) and so in the evaporator the liquid refrigerant changes its state from liquid to vapor. The refrigerant vapor is then directed back to the compressor, e.g. via a negative, or suction, pressure from the compressor suction valve and the process begins again.

In a vehicle, for example a motor vehicle, the air to be cooled by the vehicle's AC system may be drawn from either outside of the vehicle ("fresh" air), or air from within the passenger compartment ("recirculated" air). A user of the vehicle (e.g. a driver or a passenger) may select which source of air is to be used in the AC system. However, the inventors have identified some issues with the approaches described above.

In some examples, the performance of the compressor suction valve will determine the displacement of the compressor and the torque stability of the compressor. This may, ultimately, affect the temperature of the refrigerant.

If the temperature of the refrigerant is outside of a preferred range then this could cause icing on the evaporator with subsequent airflow blockage (if too cold) or unpleasant odors (if too warm), as the refrigerant temperature directly influences the airflow temperature through the evaporator. Additionally, any disturbances in the compressor's torque can lead to undesirable vibrations in some components of the compressor thereby increasing noise vibration and harshness (NVH), in some instances.

Some examples herein relate to regulating the temperature within the evaporator (hereafter referred to as "evaporator temperature"). The evaporator temperature affects aspects of the AC system such as its efficiency (e.g. if too cold) and comfort (e.g. the odor of the cooled air) and therefore some examples herein are related to regulating the evaporator temperature so that it is within a preferred range. If the evaporator temperature is within a preferred range then the cooled air may have a pleasant odor and the compressor, and therefore the AC system as a whole, may better meet fuel economy and performance targets. Some examples of the present disclosure relate to controlling and/or regulating the evaporator temperature.

As mentioned above, the temperature of the refrigerant may directly affect, or influence, the evaporator temperature. Therefore, the temperature of the refrigerant may directly affect, or influence, the odor of the cooled air and/or the efficiency of the compressor and hence of the AC system. Some examples herein relate to controlling and/or regulating the refrigerant temperature. By controlling and/or regulating the refrigerant temperature the evaporator temperature may also be controlled and/or regulated, according to some examples herein.

The performance of the suction valve, e.g. its suction pressure may, in some examples, directly influence the temperature of the refrigerant. For example, a suction valve pressure range may result in the refrigerant temperature being within a desired range which, as above, may result in the evaporator temperature being within a desired range. Some examples of the present disclosure relate to controlling, or regulating, the compressor suction valve pressure. Some examples of the present disclosure relate to determining the suction pressure of a compressor suction valve.

The current through a compressor suction valve may be directly related to, e.g. may directly influence, the pressure of the suction valve (e.g., its suction pressure). For example, an applied current that is within a desired range of currents may cause the compressor suction valve to operate at a suction pressure within a desired range of suction pressures. Some examples herein relate to determining the current through a compressor suction valve. Some examples herein relate to controlling the current through a compressor suction valve based on an evaporator fan speed.

By determining the current through the compressor suction valve, and by setting the current through the compressor suction valve to be at a desired value, or range of values, the evaporator temperature, and therefore the efficiency and performance of the AC system, may be controlled and/or regulated according to some examples presented herein.

In one example, there is provided a method of determining current through a compressor suction valve in an AC, or refrigeration, system, the system comprising an evaporator fan. The method comprises determining the speed of the evaporator fan and determining the current through the suction valve based on the speed of the evaporator fan.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows a flowchart of an example method of determining current through a compressor suction valve in a vehicle AC system;

FIG. 2 shows a flowchart of an example method of determining current through a compressor suction valve in a vehicle AC system;

FIG. 3 shows a flowchart of an example method of determining current through a compressor suction valve in a vehicle AC system; and FIG. 4 shows a schematic of an example vehicle air conditioning system.

DETAILED DESCRIPTION

The following description relates to systems and methods for determining current through compressor suction valve. In one example, a current through the suction valve may be determined based on a speed of an evaporator fan.

For a given temperature of air flowing into the evaporator, the difference between the refrigerant temperature and the evaporator temperature may, in some examples, be dependent on the flow rate of air through the evaporator. In other words, in some examples, the flow rate of air through the evaporator, or air to be cooled, e.g. air entering the evaporator, affects the temperature of the evaporator. The flow rate of air through the evaporator (hereafter referred to as "airflow rate", or "airflow rate through the evaporator") may therefore be determined by the speed of the evaporator fan, which blows the air entering the evaporator over the evaporator coils which contain the refrigerant.

Therefore, in some examples, for a given inlet air temperature, the airflow rate and the evaporator temperature may be directly proportional. As also described above, the suction valve pressure may be proportional to the evaporator temperature, since the suction valve pressure affects the refrigerant temperature. Therefore, in some examples, if the airflow rate/evaporator fan speed is known, and if the inlet air temperature is known (e.g. is measured) then modifying the suction valve current may directly affect the evaporator temperature. Therefore, in some examples, if the airflow rate/evaporator fan speed is known, and if the inlet air temperature is known (e.g. is measured) the evaporator outlet air temperature may be regulated and/or modified by regulating, determining, and/or changing the suction valve.

Some examples herein relate to measuring the temperature of air entering the evaporator, selecting a target evaporator temperature, and then using the evaporator fan speed to determine, measure, and/or control, the current through the compressor suction valve such that the target evaporator temperature is maintained for a given speed of the evaporator fan (hereafter "fan").

Some examples herein relate to determining a first relationship between the suction valve current and the inlet air temperature and evaporator temperature at a first fan speed; and determining a second relationship between the suction valve current and the inlet air temperature and evaporator temperature at a second fan speed. Some examples herein relate to using these determined relationships to determine a third relationship between suction valve current and the inlet temperature and evaporator temperature at a third fan speed, the third fan speed being different from the first and second fan speeds. For example, the first two relationships may be at least one of added, subtracted, and averaged etc. to determine the third relationship. The third relationship may be an interpolation of the first and second relationships.

In one example, the third relationship may be used to determine the suction valve current for a given inlet air temperature and fan speed (the fan speed may, in one example, be set or determined by a user) to achieve a target evaporator temperature.

Accordingly, determining the current through the suction valve may comprise determining a relationship between current through the suction valve and at least one of the temperature of air entering the evaporator fan and a target temperature of the evaporator air outlet.

Air entering the evaporator fan may be taken from outside of a vehicle comprising the AC system, and the temperature of air entering the evaporator fan may be determined by modifying the measured temperature of air outside of the vehicle based on the speed of the vehicle.

Determining the current through the suction valve may comprise determining a relationship between current through the suction valve and at least one of the modified air temperature and a target temperature of the evaporator fan air outlet.

Determining the relationship between current through the suction valve may comprise calculating a current function. The current function may be a function of the temperature of air entering the evaporator fan, a target temperature of an evaporator comprising the evaporator fan, and the speed of the evaporator fan.

Determining a relationship between current through the suction valve may comprise determining a first relationship between current through the suction valve and at least one of a temperature of air entering the evaporator fan, a target temperature of the evaporator fan, and a first evaporator fan speed. Determining a second relationship between current through the suction valve and at least one of a temperature of air entering the evaporator fan, a target temperature of the evaporator fan, and a second evaporator fan speed.

Determining the first relationship may comprise calculating a first current function I1. The first current function I1 may be a function of the temperature of air entering the evaporator fan, a target temperature of the evaporator fan, and the first evaporator fan speed. Determining the second relationship may comprise calculating a second current function I2. The second current function I2 may be a function of the temperature of air entering the evaporator fan, a target temperature of the evaporator fan, and the second evaporator fan speed. In one example, the target temperature of the evaporator fan is based on a desired interior cabin temperature.

Determining a relationship between current through the suction valve comprises calculating a third current function I3. The third current function I3 may be a function of at least one of the first and second current functions I1, I2.

The third current function I3 may be a function of the fan speed, vfan, of the evaporator fan.

Determining the current through the suction valve may comprise inputting a given fan speed into the third current function I3. The determined current may be the value of the third current function I3 at the given fan speed.

The method may further comprise setting the current through the suction valve of the value of the third current function I3 at the given fan speed.

The third current function I3 may be given by equation 1 below:

$$I3=(1-x)I1+xI2 \quad \text{(Equation 1)}$$

In equation 1, x is a function of the fan speed of the evaporator fan based on Equation 2 below:

$$x=fx(v\text{fan}) \quad \text{(Equation 2)}$$

The first evaporator fan speed may be a minimum fan speed. The second evaporator fan speed may be a maximum fan speed.

In equation 2, fx may be 0 for a minimum fan speed. fx may be 1 for a maximum fan speed.

In one example, there is provided a vehicle air conditioning system comprising a compressor configured to compress refrigerant, the compressor comprising a compressor suction valve configured to draw refrigerant into the compressor, and an evaporator comprising at least one coil and an evaporator fan configured to direct air entering the evaporator toward the at least one coil. The system is configured to direct compressed refrigerant from the compressor toward and through the at least one coil of the evaporator. The system further comprises a controller configured to set the current through the compressor suction valve based on the speed of the evaporator fan.

In one example, the air temperature in the evaporator outlet air may be maintained around 3-4 degrees Celsius or 37 to 39 degrees Fahrenheit (in some examples a refrigerant temperature may be around −20 to −30 degrees Celsius or −4 to 22 degrees Fahrenheit). In these examples, these numbers may be to efficiently cool air to around 19-20 degrees Celsius within the cabin of the vehicle, e.g. when the user sets a target air temperature of around 19-20 degrees. Therefore, in some examples the air temperature around the evaporator may be set to, e.g. 3-4 degrees, and the method may be for determining what current to flow through the suction valve to achieve this evaporator temperature.

FIG. 1 shows an example method 100 of determining current through a compressor suction valve in a vehicle AC system, the vehicle AC system comprising a compressor comprising a compressor suction valve and an evaporator comprising an evaporator fan. Instructions for carrying out method 100 and the rest of the methods included herein may be executed by a controller based on instructions stored on a memory of the controller and in conjunction with signals received from sensors of the engine system, such as the sensors described below with reference to FIG. 4. The controller may employ engine actuators of the engine system to adjust engine operation, according to the methods described below.

The method 100, at block 102, comprises determining the speed of the evaporator fan. The method 100, at block 104, comprises determining the current through the suction valve based on the speed of the evaporator fan.

Block 102 may comprise directly measuring the evaporator fan speed, e.g. by at least one fan speed sensor. Block 102 may comprise setting, by a user, the evaporator fan speed. In this example, a user may select a desired AC fan speed, for example, an AC setting corresponding to the volume of air output from an AC air outlet per unit time (this, in turn may comprise determining the fan motor speed by estimation through control voltage or current setting) and this may automatically determine a corresponding speed of the evaporator fan. Accordingly, the evaporator fan speed may be set, and therefore determined, manually or automatically. For example, a user-controllable dial in a vehicle, e.g. on the dash panel of a vehicle, may allow a user to select one of four AC settings corresponding to an intensity of cooled air being directed into the vehicle by the AC system. For example, these settings may be '1', '2', '3', or '4', and each one of these four settings may correspond to a corresponding speed of the evaporator fan, and correspondingly to an airflow rate through the evaporator fan, with '1' corresponding to a minimum fan speed and '4' corresponding to a maximum fan speed in this example.

Therefore, in some examples, block 102 may comprise setting the evaporator fan speed by a user. For example, block 102 may comprise setting the evaporator fan speed, either directly or indirectly (e.g. selecting a value that corresponds to a given evaporator fan speed) by a user.

The method 100 may comprise using a current relationship to determine the current for a given evaporator fan speed. For example, the method 100 may comprise determining a relationship between the current through the suction valve and the temperature of air entering the evaporator fan and/or the target temperature of the evaporator fan. Hereafter, the air entering the evaporator fan will be referred to as "ambient air". An example such method is shown in FIG. 2.

FIG. 2 shows an example method 200 of determining current through a compressor suction valve in a vehicle AC system, the vehicle AC system comprising a compressor comprising a compressor suction valve and an evaporator comprising an evaporator fan.

At block 202, the method 200 may comprise determining a current function, the current function being a function of the ambient air temperature and evaporator temperature. The current function is also a function of the evaporator fan speed. I.e., at block 202, the method 200 comprises determining a function I based on Equation 3 below.

$$I=I(T\text{amb},T\text{evap},v\text{fan}) \quad \text{(Equation 3)}$$

In equation 3, Tamb is the temperature of ambient air, Tevap is the evaporator temperature, and vfan is the speed of the evaporator fan. Therefore the current function I may enable the current to be determined from the three variables Tamb, Tevap, and vfan.

Block 204 represents the current function I. Blocks 206, 208 and 210 represent the three inputs to the current function I, Tamb, Tevap, and vfan, respectively.

At block 206, Tamb, is input into the current function. Accordingly, the method 200 may comprise, at block 206, determining the ambient air temperature. This may be done, for example, by at least one temperature sensor configured to measure the ambient air temperature. For example, a user may select a 'recirculated air' option, following which air entering the evaporator may be drawn from inside of the vehicle, i.e. air is recirculated from inside the vehicle to the evaporator. In this case the measured temperature of air in the vehicle, e.g. measured by at least one sensor configure to measure the air temperature inside of the vehicle, may be used as the ambient air temperature.

In another example, the user may select a 'fresh' air option following which air may be drawn from outside of the vehicle. In this example, air from outside of the vehicle may be drawn from a point outside the vehicle but close to the engine. Air drawn from such a point may be heated by the heat emitted from the vehicle engine. The heat emitted by the vehicle engine may be dependent on the speed of the vehicle (e.g. more heat at higher speeds). Therefore, the air temperature outside of the vehicle may be measured, but then modified according to the vehicle's speed to take into account the factor by which the heat from the engine affects the temperature of the air. Accordingly, air entering the evaporator fan may be taken from outside of the vehicle and determining the ambient air temperature may comprise determining the temperature of air outside of the vehicle, and modifying this temperature based on the speed of the vehicle, e.g. by multiplying the measured temperature by a speed factor.

At block 208, Tevap, is input into the current function. Accordingly, the method 200 may comprise, at block 208, determining a target evaporator temperature. In one example, block 208 may comprise setting an evaporator temperature. For example, it may be desired to regulate the evaporator temperature at approximately 3 or 4 degrees Celsius. Therefore, block 208 may comprise setting the evaporator temperatures to 3, 4 or 3.5 degrees Celsius, in some examples. In other examples, block 208 may comprise setting the evaporator temperature to other temperatures than the values listed.

At block 210, vfan is input into the current function. Accordingly, the method may comprise, at block 210, determining the speed of the evaporator fan. This may be determined by a user. For example, for example the user may directly adjust the speed of the evaporator fan. In one example, the user may adjust, or set, a fan speed setting of the vehicle's AC system (e.g. by a user controllable dial corresponding to the fan speed) which may automatically set the evaporator fan speed at a particular speed. For example, selecting an AC fan speed setting of '1' (e.g. from the values '1', '2', '3', '4', may cause the evaporator fan speed to be a minimum.

At block 212 the current function I outputs a current value for the Tamb, Tevap, and vfan that were entered into the current function. At block 214 this current value is fed through the compressor suction valve. Therefore, at block 214 the current through the suction valve is adjusted to be at, i.e. equal to, the value determined by the current function I. Said another way, the current through the suction valve is set based on the current function I previously determined.

Therefore, the method 200 allows a desired current to be calculated for a given fan speed, given a known ambient temperature and a desired evaporator temperature. Accordingly, the method 200 allows a target or setpoint evaporator temperature to be set (e.g. by a user) and the desired current to be calculated based on a given fan speed (e.g. set by a user).

The method 200 therefore provides a method of determining a desired current to achieve a particular evaporator temperature, given a fan speed that is measured or determined (e.g. by a user).

FIG. 3 shows an example method 300 of determining current through a compressor suction valve in a vehicle AC system, the vehicle AC system comprising a compressor comprising a compressor suction valve and an evaporator comprising an evaporator fan.

At block 302 the method 300 comprises determining a first current function I1. The first current function I1, determined at block 302, is a function of Tamb and Tevap, based on equation 4 below.

$$I1=I1(Tamb, Tevap) \quad \text{(Equation 4).}$$

The first current function I1 is therefore a relationship between the current and Tamb and Tevap. This relationship, I1, in this example, holds or is true, at a first evaporator fan speed v1, based on equation 5 below.

$$I1=I1(Tamb, Tevap, v1) \quad \text{(Equation 5).}$$

In equation 5, v1 may be fixed and not variable. Therefore, at block 302, the method 300 comprises determining a first current function I1, at a first evaporator fan speed v1, I1 being a function of Tamb and Tevap. The first evaporator speed may be a minimum speed of the evaporator fan, v1=vmin, based on equation 6 below.

$$I1=I1(Tamb, Tevap, vmin) \quad \text{(Equation 6).}$$

In equation 6, vmin may be fixed and not variable, e.g. the minimum fan speed may be set by the evaporator fan, e.g. determined by its specifications. Therefore, at block 302 the method 300 may comprise determining a first current function I1, at a minimum evaporator fan speed vmin, I1 being a function of Tamb and Tevap.

At block 304 the method 300 comprises determining a second current function I2. The second current function I2, determined at block 304, is a function of Tamb and Tevap, as shown by Equation 7 below.

$$I2=I2(Tamb, Tevap) \quad \text{(Equation 7).}$$

The second current function I2 is therefore a relationship between the current and Tamb and Tevap. This relationship, I2, in this example, holds or is true, at a second evaporator fan speed v2, as shown in equation 8 below.

$$I2=I2(Tamb, Tevap, v2) \quad \text{(Equation 8).}$$

In equation 8, v2 may be fixed and not variable. Therefore, at block 304, the method 300 comprises determining a second current function I2, at a second evaporator fan speed v2, I2 being a function of Tamb and Tevap. The second evaporator speed may be a maximum speed of the evaporator fan, i.e. v2=vmax, as shown in Equation 9 below.

$$I2=I2(Tamb, Tevap, vmax) \quad \text{(Equation 9).}$$

In equation 9, vmax may be fixed and not variable, e.g. the maximum fan speed may be set by the evaporator fan, e.g. determined by its specifications. Therefore, at block 304 the method 300 may comprise determining a second current function I2, at a maximum evaporator fan speed vmax, I2 being a function of Tamb and Tevap.

The method 300 may therefore comprise determining two current relationships, each applicable at different evaporator fan speeds. The method 300 may therefore comprise determining two current relationships, each applicable at a minimum and a maximum fan speed respectively.

At block 306, the method 300 comprises determining a third current function I3. The third current function I3, determined at block 304, is a function of at least one of the first and second current functions I1 and I1. In one example, the third current function I3 is a function of both the first and second current functions I1 and I2, shown in Equation 10 below.

$$I3=I3(I1, I2) \quad \text{(Equation 10).}$$

Therefore, the third current function is a function of both Tamb and Tevap, shown in Equation 11 below.

$$I3=I3(Tamb, Tevap) \quad \text{(Equation 11).}$$

In equation 11, I3 may be an interpolation function between the two functions I1 and I2. The interpolation may mean that I3 is also a function of a given fan speed, vfan, with vfan being variable. Accordingly, I3 may interpolate between I1 and I2, two relationships that are true at specific fan speeds, and may therefore be a relationship allowing the current to be determined for a given fan speed, shown in Equation 12 below.

$$I3=I3(Tamb, Tevap, vfan) \quad \text{(Equation 12).}$$

Therefore, in this example, the method 300 allows a desired current to be calculated for a given fan speed, given a known ambient temperature and a desired evaporator temperature. Accordingly, the method 300 allows a target or setpoint evaporator temperature to be set (e.g. by a user) and the desired current to be calculated based on a given fan speed.

The method 300 therefore provides a method of determining a desired current to achieve a particular evaporator temperature, given a fan speed that is determined (e.g. by a user or a desired interior temperature).

The current function I of the method 200 in the example of FIG. 2, may be the current function I3 in one example.

Determining the current through the compressor suction valve may therefore comprise, inputting a given fan speed into I3, and setting the output of I3 as the current through the suction valve.

I3, in one example, may be according to the following equation 1 rewritten below.

$$I3 = (1-x)I1 + xI2 \qquad \text{(Equation 1)}$$

In equation 1, x is a function of the evaporator fan speed, i.e. $x = fx$ (vfan).

In one example, fx is a function having its values between 0 and 1, e.g. $fx \in (0,1)$. In one example, fx is a function having its values between, and including, 0 and 1 e.g. $fx \in [0,1]$. In one example, fx is 0 for the first, or minimum fan speed, $v1$ or $vmin$. In one example, fx is 1 for the second, or maximum fan speed, $v2$ or $vmax$.

In one example, x may be given by Equation 13 below $$fx = \begin{cases} 0 \text{ for } v_1 \\ 1 \text{ for } v_2 \\ y \text{ otherwise} \end{cases} \qquad \text{(Equation 13)}$$

where y is a function between 0 and 1, i.e. $y \in (0,1)$.

It will therefore be determined that I3 is a function of x and hence a function of van speed, and that for the fan speed $v1$, e.g. a minimum fan speed, I3 is equal to the first current function I1 which is applicable at that fan speed; and that for the fan speed $v2$, e.g. a maximum fan speed, I3 is equal to the second current function I2 which is applicable at that fan speed, based on equations 14 and 15 below $$I3(x(v1)) = I3(0) = I1, \qquad \text{(Equation 14); and}$$

$$I3(x(v2)) = I3(1) = I2 \qquad \text{(Equation 15).}$$

For fan speeds that are not equal to $v1$ or $v2$ x may be a weighted sum of the two current functions I1 and I2, e.g. in the example above $I3 = (1-y)I, +yI2$ when $x \neq v1, v2$.

By way of one, non-limiting, example there may be six possible fan speeds: $v = \{vmin, v2, v3, v4, v5, vmax\}$. Is this example, x may be given by the following Equation 16:

$$(v_{fan}) = \begin{cases} 0 \text{ for } v_{min} \\ 0.2 \text{ for } v_2 \\ 05 \text{ for } v_3 \\ 0.8 \text{ for } v_4 \\ 0.9 \text{ for } v_5 \\ 1 \text{ for } v_{max} \end{cases} \qquad \text{(Equation 16)}$$

In one example, therefore x is a piecewise defined function. In one example, therefore, x is a discrete function. In one example, x may be a continuous function. In one example x is a nonlinear function. In one example, x may be a linear function.

In one example, as above, x may non-evenly or non-linearly assign a value between 0 and 1 to a given fan speed that is not the minimum or maximum fan speed.

Following on from the example above, the current for the fan speed $v4$ may be calculated as follows:

$$I3(x(v4)) = I3(0.8) = 0.2\ I1 + 0.8\ I2.$$

Therefore, in this example, the current function is given by a weighted sum of I1 and I2, with more weight being placed on I2. In this example, this has arisen since the function x assigned the value of 0.8 which is close to the value 1 (at which I3 would be I2) and therefore the current is dominated by the relationship I2 in this example. Therefore, I3 is "80% I2 and 20% I1", in this example.

It is readily seen that I3 for the fan speed $v3$ is 0.5 (I1+I2), i.e. they are weighted evenly in this example. Of course, this may not be the case for other examples (e.g. where x is not 5 for a particular fan speed).

Therefore, to achieve a desired evaporator temperature (e.g. 19, 19.5 or 20 degrees Celsius) for a given ambient temperature (which may be known or measured), I3 allows the current to be determined for a particular fan speed, which may be determined, e.g. set, by a user.

The method 300 proceeds to 308, which includes setting the current through the suction valve based on the I3 value. The current may be delivered to a suction valve actuator, thereby adjusting an amount of air drawn by the suction valve to the compressor fan.

In this way, an embodiment of a first method comprises calculating a map of a suction valve current as a function of an ambient temperature and an evaporator target temperature at a minimum fan speed. A similar map may be calculated for the suction valve current at a maximum fan speed. An interpolation-ratio map may blend the two maps based on an actual fan speed. An output of the interpolation-ratio map may be equal to a desired suction valve current set point. Additionally or alternatively, an ambient temperature axis of at least one of the minimum and maximum fan speed maps may be modified by a climate recirculation flap position to provide a more accurate estimate of an evaporator inlet air temperature. That is to say, the ambient temperature axis may be adjusted in response to ambient air being drawn from an interior cabin or from outside the interior cabin.

In another embodiment, a second method comprises calculating a map of a sensor offset temperature as a function of an ambient temperature and a fan speed. An actual desired refrigerant temperature may be calculated based on a difference between the desired refrigerant temperature and the sensor offset temperature. A refrigerant pressure/temperature curve may be used to determine a desired suction pressure which can be used with a suction valve performance curve to provide a suction valve current setpoint. This method may further be used to estimate an actual refrigerant temperature and therefore, suction pressure, by using the above described maps with some differences. One difference includes replacing the actual refrigerant temperature of the refrigerant pressure/temperature curve with a desired refrigerant temperature. This may be sued to enhance torque estimations and to infer when the system may be outside of a desired current range for the suction valve.

In one example, additionally or alternatively, the suction valve current is based on the evaporator fan speed, wherein the evaporator fan speed is dependent on one or more of a desired interior temperature, a target compressor inlet temperature, a target compressor outlet temperature, and the like. In one example, the desired interior temperature is a fixed or a dynamic value based on one or more of a user setting, an ambient temperature, and the like.

FIG. 4 shows an example vehicle air conditioning system 4 comprising a compressor 40 configured to compress refrigerant, the compressor 40 comprising a compressor suction valve 41 configured to draw refrigerant into the compressor 40. The system 4 comprises an evaporator 400 comprising at least one coil 420 and an evaporator fan 410 configured to direct air entering the evaporator toward the at least one coil 420. The system 4 is configured to direct compressed refrigerant from the compressor 40 toward and through the at least one coil 420 of the evaporator 400.

The system 4 further comprises a control system 114. Control system 114 is shown receiving information from a plurality of sensors 116 (various examples of which are described herein) and sending control signals to a plurality of actuators 181 (various examples of which are described herein).

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Sensors 116 may include a fan speed sensor, an exterior temperature sensor and an interior temperature sensor, a fan inlet temperature sensor, and the like. Actuators 181 may include a fan actuator, a suction valve actuator, and the like.

FIG. 4 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, by adjusting a suction valve current as a function of a climate fan speed, a desired current to the suction valve may be achieved. By doing this, temperature control errors and swings due to overreliance on controller terms. The technical effect of determining a fan speed and adjusting a suction valve current based on the fan speed is to mitigate evaporator icing, smells, and torque disturbances leading to vibrations.

In another representation, a method of determining current through a compressor suction valve in a vehicle air conditioning (AC) system, the AC system comprising an evaporator fan, the method comprises determining the speed of the evaporator fan, and determining the current through the suction valve based on the speed of the evaporator fan.

A first example of the method further includes where determining the current through the suction valve comprises determining a relationship between current through the suction valve and at least one of: the temperature of air entering the evaporator fan and a target temperature of the evaporator fan.

A second example of the method, optionally including the first example, further includes wherein air entering the evaporator fan is taken from outside of a vehicle comprising the AC system, and wherein the temperature of air entering the evaporator fan is determined by modifying the measured temperature of air outside of the vehicle based on the speed of the vehicle.

A third example of the method, optionally including one or more of the previous examples, further includes where determining the current through the suction valve comprises: determining a relationship between current through the suction valve and at least one of: the modified air temperature and a target temperature of the evaporator fan.

A fourth example of the method, optionally including one or more of the previous examples, further includes where determining the relationship between current through the suction valve comprises calculating a current function, wherein the current function is a function of the temperature of air entering the evaporator fan, a target temperature of an evaporator comprising the evaporator fan, and the speed of the evaporator fan A fifth example of the method, optionally including one or more of the previous examples, further includes where determining a relationship between current through the suction valve comprises determining a first relationship between current through the suction valve and at least one of a temperature of air entering the evaporator fan, a target temperature of the evaporator fan, and a first evaporator fan speed and determining a second relationship between current through the suction valve and at least one of: a temperature of air entering the evaporator fan, a target temperature of the evaporator fan, and a second evaporator fan speed.

A sixth example of the method, optionally including one or more of the previous examples, further includes where determining the first relationship comprises calculating a first current function I1, wherein the first current function I1 is a function of the temperature of air entering the evaporator fan, a target temperature of the evaporator fan, and the first evaporator fan speed; and wherein determining the second relationship comprises calculating a second current function I2, wherein the second current function I2 is a function of the temperature of air entering the evaporator fan, a target temperature of the evaporator fan, and the second evaporator fan speed.

A seventh example of the method, optionally including one or more of the previous examples, further includes where determining a relationship between current through the suction valve comprises calculating a third current function I3, the third current function I3 being a function of at least one of: the first and second current functions I1, I2.

An eighth example of the method, optionally including one or more of the previous examples, further includes where the third current function I3 is a function of the fan speed vfan of the evaporator fan.

A ninth example of the method, optionally including one or more of the previous examples, further includes where determining the current through the suction valve comprises inputting a given fan speed into the third current function I3, and wherein the determined current is the value of the third current function I3 at the given fan speed.

A tenth example of the method, optionally including one or more of the previous examples, further includes where setting the current through the suction valve of the value of the third current function I3 at the given fan sped.

An eleventh example of the method, optionally including one or more of the previous examples, further includes where the third current function I3 is given by the formula:

$$I3=(1-x)I1+x\ I2,$$

wherein x is a function of the fan speed of the evaporator fan:

$$x=x(v\text{fan}).$$

A twelfth example of the method, optionally including one or more of the previous examples, further includes where the first evaporator fan speed is a minimum fan speed and wherein the second evaporator fan speed is a maximum fan speed.

A thirteenth example of the method, optionally including one or more of the previous examples, further includes where x=0 for a minimum fan speed and wherein x=1 for a maximum fan speed.

An example of a vehicle air conditioning system comprises a compressor configured to compress refrigerant, the compressor comprising a compressor suction valve configured to draw refrigerant into the compressor, an evaporator comprising at least one coil and an evaporator fan configured to direct air entering the evaporator toward the at least one coil, wherein the system is configured to direct compressed refrigerant from the compressor toward and through the at least one coil of the evaporator, and wherein the system further comprises a controller configured to set the current through the compressor suction valve based on the speed of the evaporator fan.

While the disclosure has been illustrated and described in detail in the drawings and foregoing description, such illustration and description are to be considered illustrative or exemplary and not restrictive; the invention is not limited to the disclosed embodiments. Various alternative examples are discussed through the detailed description. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   determining a speed of an evaporator fan;
   determining a current through a compressor suction valve in an air conditioning (AC) system based on the speed of the evaporator fan.

2. The method of claim 1, wherein determining the current through the suction valve comprises:

determining a relationship between current through the suction valve and at least one of a temperature of air entering the evaporator fan and a target temperature of the evaporator fan.

3. The method of claim 2, wherein air entering the evaporator fan is taken from outside of a vehicle comprising the AC system, and wherein determining the temperature of air entering the evaporator fan comprises modifying a measured temperature of air outside of the vehicle based on a speed of the vehicle.

4. The method of claim 3, wherein determining the current through the suction valve further comprises determining a relationship between current through the suction valve and at least one of the modified measured temperature of air outside of the vehicle and the target temperature of the evaporator fan.

5. The method of claim 4, wherein determining the relationship further comprises calculating a current function, wherein the current function is a function of the temperature of air entering the evaporator fan, the target temperature of the evaporator fan, and the speed of the evaporator fan.

6. The method of claim 1, further comprising determining a first relationship between the current through the suction valve comprises and at least one of a temperature of air entering the evaporator fan, a target temperature of the evaporator fan, and a first evaporator fan speed; and determining a second relationship between current through the suction valve and at least one of the temperature of air entering the evaporator fan, the target temperature of the evaporator fan, and a second evaporator fan speed.

7. The method of claim 6, wherein determining the first relationship comprises calculating a first current function I1, wherein the first current function I1 is a function of the temperature of air entering the evaporator fan, the target temperature of the evaporator fan, and the first evaporator fan speed, and wherein determining the second relationship comprises calculating a second current function I2, wherein the second current function I2 is a function of the temperature of air entering the evaporator fan, the target temperature of the evaporator fan, and the second evaporator fan speed.

8. The method of claim 7, further comprising calculating a third current function I3, the third current function I3 being a function of at least one of the first and second current functions I1, I2 to determine the current through the suction valve.

9. The method of claim 8, wherein the third current function I3 is a function of the fan speed (vfan) of the evaporator fan.

10. The method of claim 9, wherein determining the current through the suction valve comprises inputting a given fan speed into the third current function I3, and wherein the determined current is equal to a value of the third current function I3 at the given fan speed.

11. The method of claim 10, further comprising setting the current through the suction valve equal to the value of the third current function I3 at the given fan speed.

12. The method of any of claims 8-11, wherein the third current function I3 is given by the formula:

$$I3=(1-x)I1+xI2,$$

wherein x is a function of the fan speed of the evaporator fan:

$$x=fx(vfan).$$

13. The method of claim 12, wherein the first evaporator fan speed is a minimum fan speed and wherein the second evaporator fan speed is a maximum fan speed.

14. The method of claim 13, wherein fx=0 for a minimum fan speed and wherein fx=1 for a maximum fan speed.

15. A vehicle air conditioning system comprising:
a compressor configured to compress refrigerant, the compressor comprising a compressor suction valve configured to draw refrigerant into the compressor; and
an evaporator comprising at least one coil and an evaporator fan configured to direct air entering the evaporator toward the at least one coil;
wherein the system is configured to direct compressed refrigerant from the compressor toward and through the at least one coil of the evaporator, and wherein the system further comprises:
a controller with computer-readable instructions stored on memory thereof that when executed enable the controller to set a current through the compressor suction valve based on at least a speed of the evaporator fan.

16. The vehicle air conditioning system of claim 15, wherein the speed of the evaporator fan is based on a desired interior cabin temperature, a temperature of air entering the evaporator fan, and a target temperature of the evaporator fan.

17. A system, comprising:
an air conditioning system comprising a suction valve and an evaporator fan; and
a controller with computer-readable instructions stored on memory thereof that when executed enable the controller to:
determine a first relationship between current through the suction valve and at least one of a temperature of air entering the evaporator fan, a target temperature of the evaporator fan, and a first evaporator fan speed;
determine a second relationship between current through the suction valve and at least one of the temperature of air entering the evaporator fan, the target temperature of the evaporator fan, and a second evaporator fan speed;
set a suction valve current based on an interpolation between the first relationship and the second relationship.

18. The system of claim 17, wherein the first evaporator fan speed is a minimum speed and the second evaporator fan speed is a maximum speed.

19. The system of claim 17, wherein the temperature of air entering the evaporator fan is based on an ambient air temperature within a vehicle cabin or outside of a vehicle cabin.

20. The system of claim 17, wherein the target temperature of the evaporator fan is based on a desired interior cabin temperature.

* * * * *